United States Patent [19]

Yamada et al.

[11] 4,030,133
[45] June 14, 1977

[54] GUIDE DRUM APPARATUS FOR A VIDEO TAPE RECORDER AND/OR PLAYER

[75] Inventors: Kiichiro Yamada, Nishinomiya; Isao Kozu, Katano; Takenori Akamine, Osaka; Ryota Shimizu, Katano, all of Japan

[73] Assignee: Matsushita Electric Industrial Co., Ltd., Kadoma, Osaka, Japan

[22] Filed: Sept. 9, 1975

[21] Appl. No.: 611,601

[30] Foreign Application Priority Data

Sept. 18, 1974 Japan .............................. 49-108244

[52] U.S. Cl. .................. 360/84; 360/107; 360/130
[51] Int. Cl.² ...................... G11B 5/52; G11B 21/18
[58] Field of Search ............ 360/84, 107, 83, 130, 360/109, 128

[56] References Cited

UNITED STATES PATENTS

| | | | |
|---|---|---|---|
| 3,075,049 | 1/1963 | Gordon et al. | 360/84 |
| 3,076,060 | 1/1963 | Horstkorta | 360/107 |
| 3,567,869 | 3/1971 | Hirota et al. | 360/107 |
| 3,863,269 | 1/1975 | Akamine | 360/84 |

Primary Examiner—Alfred H. Eddleman
Attorney, Agent, or Firm—Wenderoth, Lind & Ponack

[57] ABSTRACT

A guide drum apparatus for a video tape recorder and/or player has: a main shaft secured on a chassis, a first guide drum rotatably mounted on the main shaft and having a plurality of magnetic video heads, driving means for rotating the first guide drum at a rotational speed greater than the speed of movement of a tape, and a second guide drum mounted on the main shaft coaxially with the first guide drum and rotatable independently therefrom. The first and second guide drums have tape guiding portions, respectively, which are opposed to each other and have peripheral tape guide surfaces to guide the magnetic tape. Adjusting means is mounted on the main shaft so as to adjust the height of the video heads with respect to the tape guiding portion of the second guide drum. With this guide drum apparatus, the height of the video heads can be adjusted precisely and easily to trace the video track on the tape even while the video heads are rotating at a high speed.

4 Claims, 4 Drawing Figures

GUIDE DRUM APPARATUS FOR A VIDEO TAPE RECORDER AND/OR PLAYER

BACKGROUND OF THE INVENTION

This invention relates to a guide drum apparatus for a magnetic tape, and more particularly to a guide drum apparatus for guiding a magnetic tape around the periphery thereof for the purpose of recording and/or reproducing video signals on the tape.

A guide drum apparatus according to this invention is preferably used in a video tape recorder or a video tape player in which a field or a frame of the video signal is successively recorded in the longitudinal direction of a magnetic tape, and the video signal is reproduced by magnetic heads mounted on the guide drum apparatus while the tape is moving around the periphery of the guide drum apparatus.

In such video equipment, it is very important for the quality of a picture image to maintain the height and the straightness of a video track on the tape accurately while the tape is moving around the guide drum. It is also important that the rotating video heads should scan the video track on the tape accurately for good reproduction of the video signals. Conventionally, it is difficult in such video equipment to provide a simple construction of the guide drum apparatus in which the video heads can be easily adjusted to exactly trace the video track on the tape while the video heads are rotating at a high speed.

SUMMARY OF THE INVENTION

It is therefore, an object of this invention to provide a novel and improved guide drum apparatus for a magnetic tape.

Another object of this invention is to provide an improved guide drum apparatus suitable for a video tape recorder or a video tape player in which good quality of a picture image can be obtained.

Still another object of this invention is to provide an improved guide drum apparatus in which the height of the video heads can be adjusted precisely and easily to trace the video track on the tape even while the video heads are rotating at a high speed.

These objects are achieved according to this invention by providing a guide drum apparatus for a magnetic tape which comprises: a main shaft fixedly secured on a chassis; a first guide drum rotatably mounted on the main shaft and having a tape guiding portion at the periphery thereof and a plurality of magnetic video heads mounted thereon; driving means for rotating the first guide drum at a rotational speed greater than the speed of movement of the tape; a second guide drum mounted on the main shaft coaxially with the first guide drum and rotatable independently from the first guide drum, the second guide drum having a tape guiding portion at the periphery thereof and which is opposed to the tape guiding portion of the first guide drum, the guide drums having peripheral tape guide surfaces which together guide the magnetic tape; and adjusting means movably mounted on the main shaft for movement in the longitudinal direction of the main shaft so as to adjust the height position of the magnetic video heads with respect to the tape guiding portion of the second guide drum.

BRIEF DESCRIPTION OF THE DRAWINGS

Further objects and advantages of this invention will become apparent from the following detailed description considered with reference to the accompanying drawings, in which.

DETAILED DESCRIPTION OF THE PREFERRED EMBODIMENT

Figure 1:
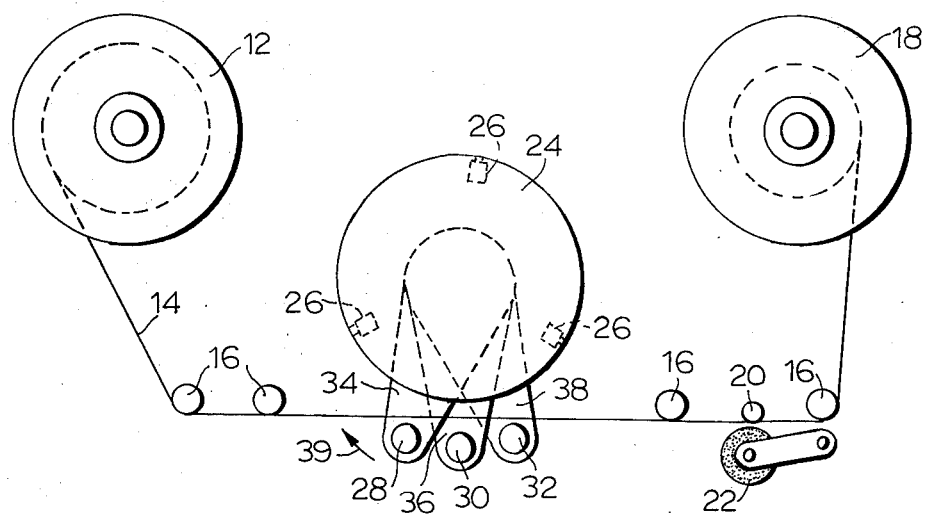
FIG. 1 is a schematic plan view of a guide drum apparatus according to this invention.

Referring now to the drawings, there will be described a preferred embodiment of a guide drum apparatus according to this invention. In these drawings, like elements are designated by the same reference numbers With reference to FIG. 1, a magnetic tape designated by a reference numeral 14 drawn out from a supply reel 12 is guided by guide pins 16 and is wrapped on a takeup reel 18. The tape 14 can be moved from the supply reel 12 to the takeup reel 18 by a capstan 20 and a pressure roller 22 which is adapted to be pressed against the capstan 20.

Figure 2:
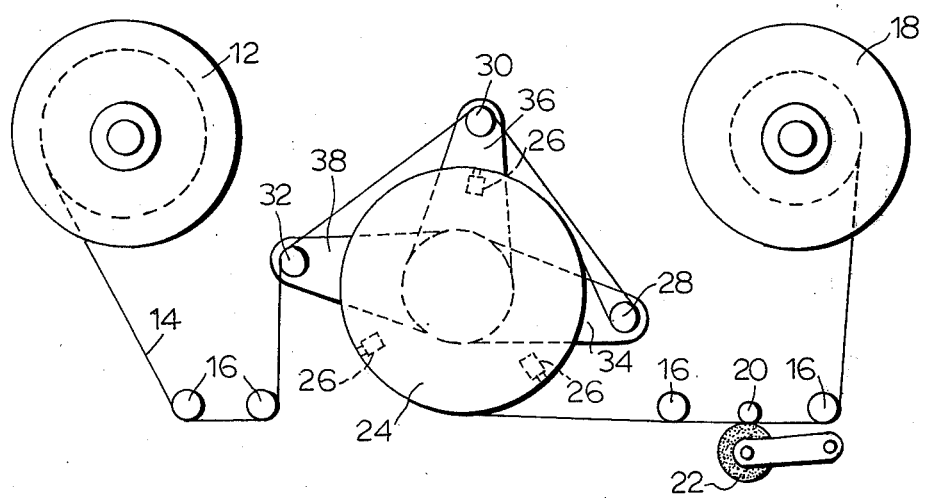
FIG. 2 is a schematic plan view of a guide drum apparatus similar to FIG. 1, wherein a magnetic tape is wrapped around guide drums.

A guide drum apparatus 24 has three magnetic video heads 26 which are equally spaced therearound. Tape wrapping pins 28, 30 and 32 are secured on corresponding arms 34, 36 and 38, respectively. The arms 34, 36 and 38 are swingably mounted on a central axis of the guide drum apparatus 24. In accordance with the swinging motion of the arms 34, 36 and 38 in the direction of the arrow 39, the tape 14 is wrapped around the guide drum apparatus 24 so as to contact the drum through an angle of more than 240°, as shown in FIG. 2.

Figure 3:
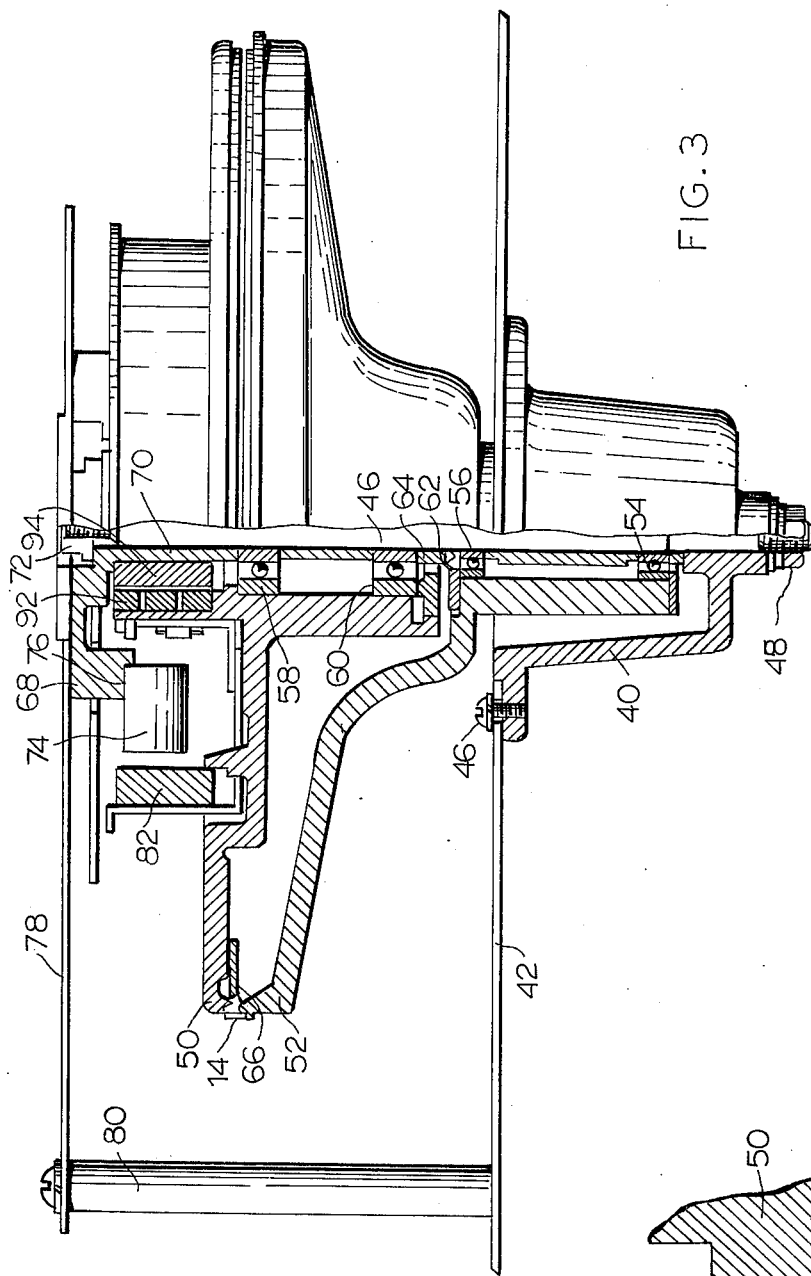
FIG. 3 is a sectional and elevational view of the guide drum apparatus according to this invention.

Referring to FIG. 3, there will be described in detail the structure of the guide drum apparatus 24. A housing 40 is secured on a chassis 42 by screws 44. A main shaft 46 is fixedly secured on the housing 40 by a nut 48. The guide drum apparatus 24 mainly comprises a first guide drum 50 and a second guide drum 52. The second guide drum 52 is rotatably mounted on the lower portion of the main shaft 46 by a pair of ball bearings 54 and 56.

The first guide drum 50 is rotatably mounted on the upper portion of the main shaft 46 by pair of ball bearings 58 and 60. At a middle portion of the main shaft 46, a wave washer 62 and a spacer sleeve 64 are positioned between the ball bearings 54 and 60 so that the first guide drum 50 and the second guide drum 52 are rotatable independently of each other. The first guide drum 50 has three magnetic video heads 66 which are equally spaced therearound at an angle of 120° relative to each other. The first guide drum 50 is rotated at a predetermined rotational speed (at a rate of 1,200 r.p.m. in this embodiment) by driving means which will be described in more detail hereinafter. The first guide drum 50 in this embodiment is directly driven by a brushless D.C. motor unit which is mounted on the top portion of the main shaft 46, but can be easily modified so as to be driven through an endless rubber belt by a motor which is positioned apart from the guide drum apparatus 24. The main shaft 46 has a stator holder 68 slidably mounted on the top portion thereof. A sleeve portion 70 of the stator holder 68 is urged toward the inner race of the ball bearing 58 by an adjusting nut 72 which is mounted on the threaded top end of the main shaft 46. A stator winding 74 of the brushless D. C. motor unit is secured to a flange portion 76 of the stator holder 68 which is fixedly supported by a resilient plate 78 secured to a supporting shaft 80 on the chassis 42 so that the stator holder 68 is prevented from rotating around the main shaft 46.

On the other hand, a ring magnet 82 is fixedly mounted on a top portion of the first guide drum 50, the inner surface of the ring magnet 82 being opposed to the stator winding 74. The ring magnet 82 is driven by the stator winding 74 when the stator winding 74 is energized by driving and controlling circuits, which are well known in the prior art so that a detailed description thereof is omitted herein.

Figure 4:
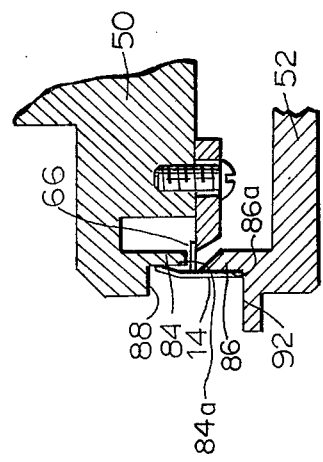
FIG. 4 is an enlarged sectional view of the tape guiding portions of the guide drum apparatus according to this invention.

Referring to FIG. 4, the guide drums 50 and 52 have tape guiding portions 84 and 86 with tape guiding surfaces 84a and 86a on the outer peripheries thereof, respectively. The tape guiding portions 84 and 86 are opposed to each other with the tape guiding surfaces 84a and 86a substantially aligned so as to guide the magnetic tape 14 thereon. The guide drums 50 and 52 also have a first flange 88 and a second flange 90 integral therewith and extending radially outwardly beyond the tape guiding portions 84 and 86, respectively.

While the tape 14 is wrapped around the guide drums 50 and 52, upward movement of the tape 14 is regulated by the first flange 88, and downward movement of the tape 14 is also regulated by the second flange 92 so that the tape is maintained at a precise position during the horizontal movement of the tape 14 around the guide drums 50 and 52. When the tape 14 is moved by the capstan 20 and the pressure roller 22 after the tape 14 has been wrapped around the guide drum apparatus 24 through an angle of more than 240° by the tape wrapping pins 28, 30, 32, as shown in FIG. 2, the second guide drum 52 is driven by the tape 14 due to the friction between the tape and the drum. Accordingly, the second guide drum 52 rotates due to the tape movement while the first guide drum 50 is rotating at a predetermined high speed by the driving means.

Three magnetic video heads 66 fixedly mounted on the first guide drum 50 are adapted to contact the tape 14 wrapped around the guide drums 50 and 52 at the position between the tape guiding portions 84 and 86. The output video signals from the video heads 66 are led to an outer rotary transformer 92 shown in FIG. 3 which is mounted on the first guide drum 50, and transferred to an inner transformer 94 shown in FIG 3 which is secured to the sleeve portion 70 of the stator holder 68. Video signals transferred to the inner transformer 94 can be led to a suitable amplifier (not shown).

As described above, the tape 14 is wrapped around the guide drums 50 and 52 through an angle of more than 240°, as shown in FIG. 2. Therefore, at least two of the video heads 66 are always in contact with the tape 14 while the other head is not in contact with the tape 14. In this embodiment, longitudinally recorded signals, such as a field of the video signals, are successively scanned by the video heads 66 one after another so that a still picture image can be displayed on a TV screen.

The tape 14 is firmly pressed around the second guide drum 52 while the tape 14 is moving so that the second guide drum 52 rotates with the tape movement without any slippage between the tape 14 and the second guide drum 52. Accordingly, when one of the video heads 66 is brought into contact with the tape 14, the vibration of the tape 14 caused by the contact of the video head 66 can be absorbed by the inertia of the second drum 52 and the friction between the tape 14 and the second guide drum 52. Therefore, the vibration is not transmitted to the position where the other video heads 66 are simply scanning. Since the width of the video heads 66 is very small in the video equipment, the video heads 66 must scan the tape 14 precisely so as to record the video track on the tape 14 at a predetermined height position or to trace the recorded video track on the tape 14 exactly.

During the tape movement, the lower edge of the tape 14 is pressed against the upper surface of the second flange 92 of the second guide drum 52 by the weight of the tape 14 and air flow is introduced between the tape 14 and the first guide drum 50 so that the tape 14 can be maintained in its precise height position by the second flange 92 of the second guide drum 52. The height of the video heads 66 from the lower edge of the wrapped tape 14 (or from the upper surface of the second flange 92 of the second guide drum 52) can be adjusted by rotating the nut 72 on the top portion of the main shaft 46. When the nut 72 is rotated clockwise to slide the sleeve portion 70 of the stator holder 68 downward in the longitudinal direction of the main shaft 46, the wave washer 62 is bent by the downward movement of the inner race of the ball bearing 60. This causes the downward movement of the first guide drum 50. When the nut 72 is rotated counterclockwise, the stator holder 68 and the ball bearings 58, 60 are moved upwards by the spring action of the bent wave washer 62. This causes the upward movement of the first guide drum 50. By the upward and downward movements of the first guide drum 50, the height of the video heads 66 can be regulated. Such height adjustment of the video heads 66 can be easily made even when the first guide drum 50 is rotating at a high speed because the nut 72 is mounted on the top of the stationary main shaft 46. Accordingly, the optimum height position of the video heads 66 can be set by finding the maximum value of the output level of the reproduced video signals which can be measured by electronic measuring instruments.

In addition, the height position of the tape 14 is not changed during the adjustment of the height of the video heads 66 so that height alignment between the tape 14 and the guide pins 16 will not be disturbed. This is quite effective to maintain the smooth and stable movement of the tape 14 around the guide drum apparatus 24.

The pressing force of the wave washer 62 is supported by the housing 40 through the inner race of the ball bearings 54 and 56, and is not imparted onto the outer race of the ball bearings 54 and 56. Therefore, the second guide drum 52 is not disturbed in its smooth rotation.

It is apparent that various modifications may be made without departing from the substantial properties in this invention. The above described specific embodiment is intended merely to illustrate the various facets in certain selective examples of this invention, the scope of which shall be limited only by the following claims.

What is claimed is:

1. A guide drum apparatus for a video tape recorder and/or player in which a field or a frame of video signal is recorded in the longitudinal direction of a moving magnetic tape, and the recorded video signal is reproduced while the tape is moving, said apparatus comprising:

a main shaft fixedly secured on a chassis;

a first guide drum rotatably mounted on said main shaft and having a tape guiding surface on the periphery thereof and a plurality of magnetic video heads mounted thereon;

driving means coupled to said first guide drum for rotating said first guide drum at a rotational speed greater than the speed of movement of the tape;

a second guide drum mounted on said fixedly secured main shaft coaxially with said first guide drum and having a tape guiding portion at the periphery thereof which is opposed to the tape guiding portion of said first guide drum in the direction of the axis of said shaft so as to guide the magnetic tape together with said tape guiding surface on said first guide drum, said second guide drum being rotatable independently from said first guide drum at a lower rotational speed than that of said first guide drum according to the movement of the tape and due to the friction between the tape and the tape guiding portion of said second guide drum while said first guide drum is rotating at said greater rotational speed, whereby while moving around said guide drums the magnetic tape is scanned by said magnetic heads; and adjusting means mounted on said fixedly secured main shaft and movable in a longitudinal direction of said fixedly secured main shaft for adjusting the height position of said magnetic video heads relative to the tape guiding portion of said second guide drum even while said first guide drum is rotating.

2. A guide drum apparatus as claimed in claim 1, wherein said adjusting means is coupled to said first guide drum for sliding said first guide drum in the longitudinal direction of said fixedly secured main shaft in finely controlled movements so as to adjust the height position of said mangetic video heads relative to the tape guiding portion of said second guide drum.

3. A guide drum apparatus as claimed in claim 2, wherein said first guide drum is rotatably mounted on said fixedly secured main shaft by a ball bearing, the inner race of said ball bearing being slidable along said fixedly secured main shaft in the longitudinal direction when driven by said adjusting means.

4. A guide drum apparatus as claimed in claim 3, wherein said adjusting means comprises a nut threaded onto the top portion of said fixedly secured main shaft and a wave washer on said fixedly secured main shaft, whereby the inner race of said ball bearing is driven along the shaft in one direction by the rotation of said nut and in the other direction by the spring action of said wave washer so as to adjust the height position of the magnetic video heads relative to the tape guiding portion of said second drum.

* * * * *